US010556759B2

(12) United States Patent
Belluk et al.

(10) Patent No.: US 10,556,759 B2
(45) Date of Patent: Feb. 11, 2020

(54) REMOTE-CONTROLLED MATERIAL-CONVEYING SYSTEM

(71) Applicant: AG GROWTH INTERNATIONAL INC., Winnipeg, Manitoba (CA)

(72) Inventors: Brent Belluk, Winnipeg (CA); Tim Strydhorst, Winnipeg (CA); Chris Manning, Rosenort (CA); Brian Wilcox, Rosenort (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 101 days.

(21) Appl. No.: 14/180,331

(22) Filed: Feb. 13, 2014

(65) Prior Publication Data

US 2015/0225188 A1    Aug. 13, 2015

(30) Foreign Application Priority Data

Feb. 10, 2014  (CA) ...................... 2842387

(51) Int. Cl.
*B65G 65/00* (2006.01)
*B65G 43/00* (2006.01)
(Continued)

(52) U.S. Cl.
CPC .......... *B65G 65/005* (2013.01); *A01C 15/003* (2013.01); *B65G 43/00* (2013.01);
(Continued)

(58) Field of Classification Search
CPC .............. B65G 65/00–02; B65G 65/06; G08C 2201/93
See application file for complete search history.

(56) References Cited

U.S. PATENT DOCUMENTS 3,885,375 A * 5/1975 Solterbeck ............ A01D 45/02
                                                           56/105
5,094,334 A    3/1992 Bobrowski
(Continued)

OTHER PUBLICATIONS

Sunova Broadcaster Product webpage http://www.sunova.ca/broadcaster1.htm dated Apr. 12, 2012.

*Primary Examiner* — Jerrah Edwards
(74) *Attorney, Agent, or Firm* — Neal, Gerber & Eisenberg LLP

(57) ABSTRACT

A material-conveying system has a material-conveying apparatus for conveying material, an electronic control unit, a user interface control panel mounted to the apparatus and interfaced with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit to the apparatus, a wireless receiver at the apparatus for receiving the command signals from the portable remote control device and for transmitting the command signals to the electronic control unit that controls the power output of the power unit. The portable remote control device is also configured to wirelessly transmit a control signal to a gate controller of a material-unloading gate of a material container.

36 Claims, 8 Drawing Sheets

(51) Int. Cl.
*B65G 67/00* (2006.01)
*B65G 69/00* (2006.01)
*G08C 17/02* (2006.01)
*B65G 67/02* (2006.01)
*A01C 15/00* (2006.01)

(52) U.S. Cl.
CPC ............ *B65G 67/02* (2013.01); *B65G 69/00* (2013.01); *G08C 17/02* (2013.01); *G08C 2201/50* (2013.01)

(56) References Cited

U.S. PATENT DOCUMENTS

| | | | | |
|---|---|---|---|---|
| 5,282,713 A | * | 2/1994 | Lande | B02C 18/0076 198/311 |
| 5,305,866 A | | 4/1994 | Stewart | |
| 5,829,819 A | * | 11/1998 | Searfoss | B60J 7/085 242/225 |
| 6,112,139 A | * | 8/2000 | Schubert | E02F 3/847 172/4.5 |
| 7,191,889 B1 | * | 3/2007 | Heley | B65G 21/10 198/301 |
| 7,249,449 B2 | * | 7/2007 | Goering | A01D 46/085 56/30 |
| 7,398,144 B2 | * | 7/2008 | Strosser | A01D 41/14 56/10.2 R |
| 8,055,399 B2 | * | 11/2011 | Wyatt | B60K 7/0007 701/22 |
| 8,272,493 B1 | * | 9/2012 | Grengs | B65G 33/24 198/300 |
| 9,085,381 B2 | * | 7/2015 | Gengerke | B65B 1/32 |
| 2006/0005521 A1 | * | 1/2006 | Goering | A01D 46/085 56/30 |
| 2007/0012011 A1 | * | 1/2007 | Strosser | A01D 34/40 56/10.2 R |
| 2008/0006512 A1 | | 1/2008 | Kuhus | |
| 2008/0201994 A1 | * | 8/2008 | Crago | E01H 5/06 37/197 |
| 2009/0164074 A1 | | 6/2009 | Cui | |
| 2010/0125384 A1 | * | 5/2010 | Wyatt | B60K 7/0007 701/22 |
| 2013/0085627 A1 | | 4/2013 | Rausch et al. | |
| 2013/0269832 A1 | * | 10/2013 | Gengerke | B65B 1/32 141/95 |

* cited by examiner

REMOTE-CONTROLLED MATERIAL-CONVEYING SYSTEM

CROSS-REFERENCE TO RELATED APPLICATIONS

This application claims priority from Canadian Patent Application Serial Number 2842387 filed on Feb. 10, 2014, which is incorporated by reference in its entirety.

TECHNICAL FIELD

The present invention relates generally to material-conveying systems and, more particularly, to grain-handling systems.

BACKGROUND

In the agricultural industry, various types of conveyors or material-conveying mechanisms are used to transport grain, seed, fertilizer and other such bulk materials. Belt conveyors are typically used to convey seeds. Augers are typically used to move products like grain, oil seeds and other similar bulk materials. An auger includes a flighting, which is a rotating helical screw blade, that conveys the grain or other material. The auger may be powered by a tractor power takeoff or standalone power unit like a diesel engine. The tractor PTO is coupled by a drive shaft or driveline to the auger.

Conventionally, the function of powering the auger through the PTO of the tractor and then throttling the PTO up and down to achieve desired auger run speeds both when empty and full are performed manually by an operator situated at the power unit. This results in several entries and exits from the tractor (or trips to the power unit) during the loading or unloading of a semi-trailer or truck, which is inefficient. The more trips that an operator makes both in and out of equipment increases the likelihood of fatigue, mistakes and errors during the high activity periods of harvest and grain transport, which can give rise to operator safety issues.

In view of the foregoing, an improved material-conveying system is highly desirable in order to address the shortcomings of the prior art.

SUMMARY

The present invention is directed to a remotely controllable material-conveying system in which the power unit, such as a tractor power takeoff (PTO), is mechanically coupled to a conveyor or other material-conveying apparatus or mechanism such as an auger or belt conveyor, and is controlled remotely in response to user commands received by a portable remote control device or by a control panel at the apparatus. The portable remote control device receives user commands and transmits these commands to a receiver of an electronic control unit. This electronic control unit sends the commands to the power unit (e.g. tractor PTO) via a data bus, e.g. ISOBUS-compatible data connection for a tractor. This enables a user to remotely control the power output by a power unit such as a tractor PTO without having to directly manipulate the power controls of the power unit. For example, the user may engage/disengage the tractor PTO and/or may control the throttle or power output of the PTO. The present invention may also be used to control a standalone power unit, e.g. a diesel or gas engine or electric motor, or to control an engine or motor that is mounted directly to a portable auger, conveyor belt system or other material-conveying apparatus. In addition to controlling the power to the material-conveying apparatus, the portable remote control device wirelessly is configured to control a gate controller to actuate a gate or hopper gate of a truck or other material container. Optionally, the portable remote control device may control a tarp actuator to open or close a tarp on the truck or other material container. Optionally, the portable remote control device may receive a signal from a bin sensor and/or control a bin sweep. Further options are described below.

The material-conveying apparatus or mechanism may be any grain-handling or material-conveying apparatus such as an auger, a conveyor belt or other portable grain-handling equipment such as grain vacs (i.e. pneumatic grain-moving equipments), drag chains, grain pumps, etc. For the purposes of this specification, grain is meant to include grain, grain-like substances, oil seeds or any other bulk material that has similar of analogous bulk flowing characteristics like, for example, fertilizer or substances likes coal. It will be appreciated that this technology may be applied to other particulate or bulk material in industries outside of agriculture.

From the foregoing, it is apparent that the invention may be used, or adapted for use, to control the power output of a power unit that is mechanically coupled to a material-conveying apparatus. Although this technology is primarily intended for a tractor PTO coupled to an auger, it may also be used for a tractor PTO coupled to a belt conveyor or any other compatible material-conveying apparatus. Likewise, the power output of a standalone internal combustion engine (e.g. diesel or gasoline) or electric motor may be controlled using this invention to drive an auger, belt conveyor or any other compatible material-conveying apparatus. This invention may also be applied to control the engine or motor attached to a portable auger, belt conveyor or other material-conveying apparatus.

Accordingly, an inventive aspect of the present disclosure is a material-conveying system comprising a material-conveying apparatus for conveying material, an electronic control unit mounted to the apparatus, a user interface control panel mounted to the apparatus and interface with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit to the apparatus, a wireless receiver at the apparatus for receiving the command signals from the portable remote control device and for transmitting the command signals to the electronic control unit that controls the power output of the power unit. The portable remote control device is configured to wirelessly transmit a control signal to a gate controller of a material-unloading gate of a material container.

Another inventive aspect of the present disclosure is a portable remote control device for portable remote control device for remotely controlling a material-conveying system having a material-conveying apparatus driven by a power unit, the portable remote control device having a user interface configured to receive a power control command, a radiofrequency transceiver that transmits, in response to receiving the power control command, a power control signal representing the power control command to a wireless receiver connected to an electronic control unit at the material-conveying apparatus that transmits the power control signal via a data bus to the power unit to thereby operate the material-conveying apparatus in response to the power control command. The user interface is also configured to receive a gate control command. The radiofrequency transceiver transmits, in response to receiving the gate control command, a gate control signal representing the gate control command to a gate controller of a material-unloading gate of a material container for operating the gate in response to the gate control command.

Another inventive aspect of the present disclosure is a computer-readable medium computer-readable medium comprising computer instructions in code which when stored in a memory and executed by a processor of a wireless communications device cause the wireless communications device to present a user interface configured to receive a power control command, transmit using a radiofrequency transceiver, in response to receiving the power control command, a power control signal representing the power control command to a wireless receiver connected to an electronic control unit at the material-conveying apparatus that transmits the power control signal via a data bus to the power unit to thereby operate the material-conveying apparatus in response to the power control command, receive a gate control command via the user interface and transmit, using the radiofrequency transceiver, in response to receiving the gate control command, a gate control signal representing the gate control command to a gate controller of a material-unloading gate of a material container for operating the gate in response to the gate control command.

Yet a further inventive aspect of the present disclosure is an automatically adjusting material-conveying system comprising a material-conveying apparatus for conveying material, an electronic control unit mounted to the apparatus, a user interface control panel mounted to the apparatus and interface with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit the apparatus, a wireless receiver at the apparatus for receiving the command signals from the portable remote control device and for transmitting the command signals to the electronic control unit that controls the power output of the power unit. The system also includes a material-displacement sensor for sensing displacement of material and for sending a material-displacement signal to the electronic control unit to automatically control the power output to the material-conveying apparatus.

Yet a further inventive aspect of the present disclosure is an enhanced safety material-conveying system comprising a material-conveying apparatus for conveying material, an electronic control unit mounted to the apparatus, a user interface control panel mounted to the apparatus and interfaced with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit to the apparatus, a wireless receiver at the apparatus for receiving the command signals from the portable remote control device and for transmitting the command signals to the electronic control unit that controls the power output of the power unit. The system provides enhanced safety by including a body-detecting safety sensor for detecting a body near a driveshaft of the power unit or near the material-conveying apparatus, the safety sensor sending a shutdown signal to the electronic control unit to shut off the power output to the apparatus.

Yet a further inventive aspect of the present disclosure is a material-conveying system with an emergency stop capability comprising a material-conveying apparatus for conveying material, an electronic control unit mounted to the apparatus, a user interface control panel mounted to the apparatus and interfaced with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit to the apparatus, a wireless receiver at the apparatus for receiving the command signals from the portable remote control device and for transmitting the command signals to the electronic control unit that controls the power output of the power unit. The portable remote control device further includes an emergency stop user input device for shutting off the power output to the apparatus and for stopping a bin sweep in a bin.

Yet a further inventive aspect of the present disclosure is a material-conveying system with a bin sweep control comprising a material-conveying apparatus for conveying material, an electronic control unit mounted to the apparatus, a user interface control panel mounted to the apparatus and interfaced with the electronic control unit to receive user input commands to control the apparatus, a power unit mechanically coupled to the apparatus for powering the apparatus, a data bus communicatively connected between the power unit and the control unit, a portable remote control device for wirelessly transmitting command signals for remotely controlling a power output of the power unit to the apparatus, a wireless receiver at the apparatus for receiving the command signals from the portable remote control device and for transmitting the command signals to the electronic control unit that controls the power output of the power unit. Bin sweep control is provided by the portable remote control device that enables the user to wirelessly control a bin sweep inside a material-containing bin.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
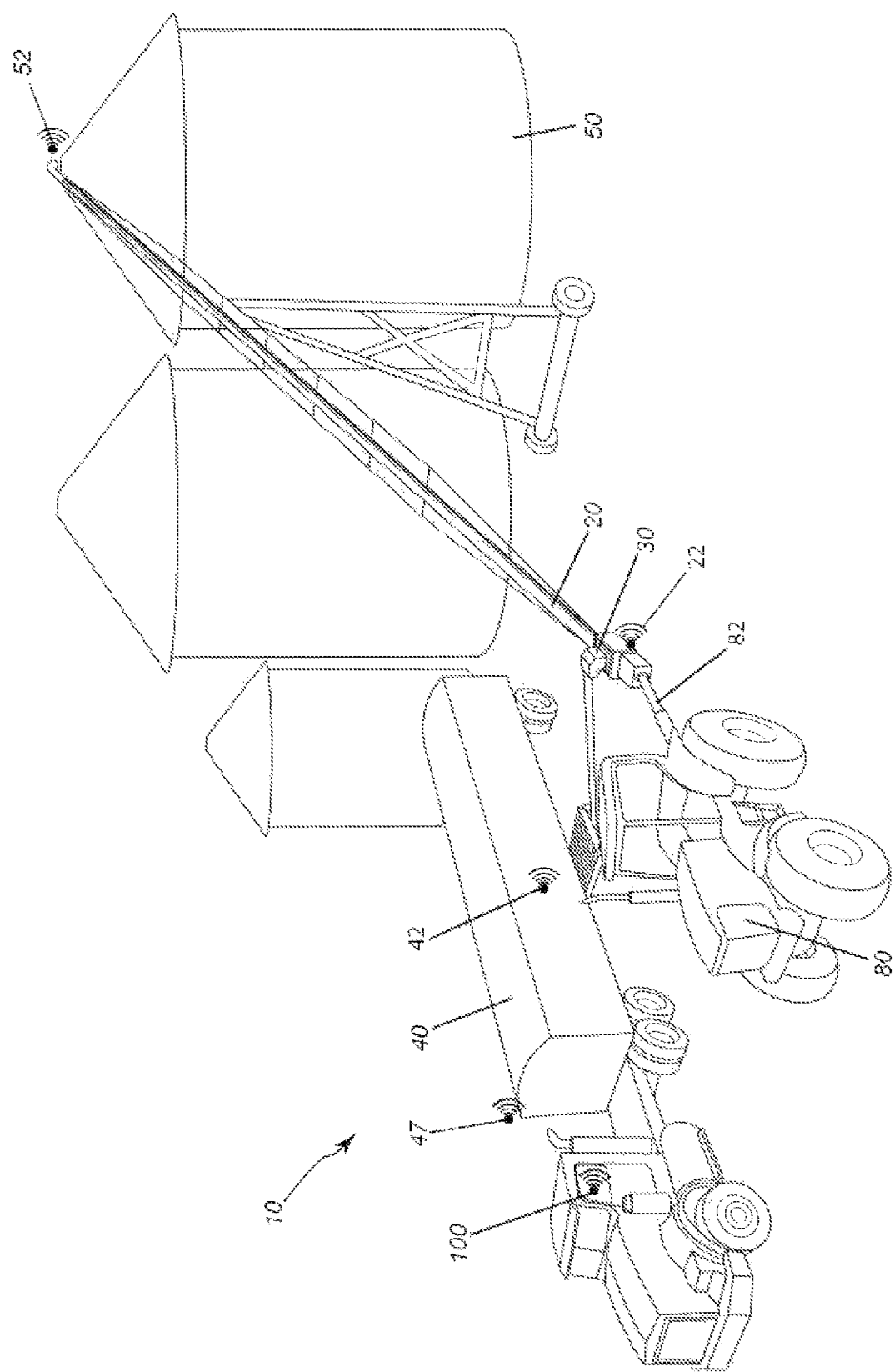
FIG. 1 illustrates a material-conveying system having an auger driven by a tractor PTO in accordance with an embodiment of the present invention.

FIG. 1 depicts a remotely controllable material-conveying system, generally designated by reference numeral 10, in accordance with an embodiment of the present invention. The material-conveying system illustrated by way of example in FIG. 1 is an auger system for grain handling. Although an auger system is illustrated in this figure, it will be appreciated that the present invention may be applied to conveyor belt systems and to other material-conveying systems.

The system 10 depicted by way of example in FIG. 1 includes an auger 20 designed to convey grain, seeds or other bulk material. As shown in FIG. 1, the auger (or "main auger") may receive grain from a swing auger 30 into which grain is discharged from a truck 40 or other transportable or fixed material container such as a wagon, train car, cart, bin, etc. The grain is conveyed from the swing auger onto the main auger and thereafter into a grain bin 50 or silo for drying, aeration, and storage.

The remotely controllable auger system 10 includes, in addition to the main auger 20 for conveying the material, an electronic control unit 60 mounted to the auger 20 and a user interface control panel 70 mounted to the auger and interfaced with the electronic control unit 60 to receive user input commands to control the auger. The system 10 further includes a power unit 80 mechanically connected via a PTO driveline or driveshaft 82 to the auger for powering the auger. The system also includes a data bus 90 connected between the power unit and the electronic control unit. The system 10 further includes a portable remote control device 100 (which is also referred to herein as a portable remote control interface or portable remote control unit or handheld wireless controller) for wirelessly controlling the power output of the power unit to the material-conveying apparatus and also for controlling a gate controller of a material-unloading gate of a truck or other material container.

In the best mode of implementing the invention, the power unit 80 is a tractor PTO and the data bus is an ISOBUS (i.e. a data bus compatible with the standard set forth in ISO 11783). The data bus provides a data communication link between the tractor and the electronic control unit. However, any other suitable wired or wireless data connection may be employed to transfer data from the electronic control unit to the tractor.

Figure 2:
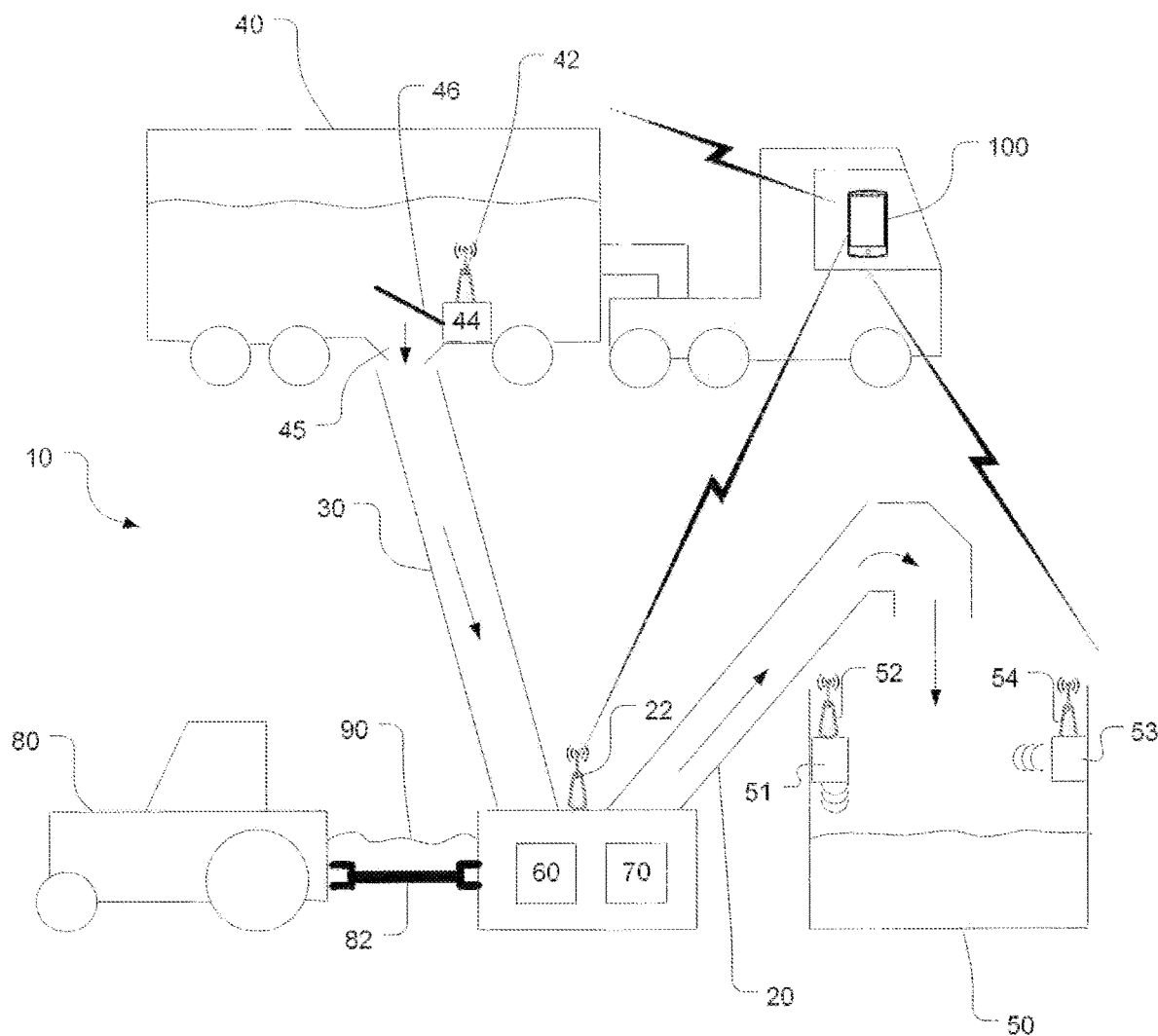
FIG. 2 is a schematic depiction of the material-conveying system of FIG. 1 when transferring material from a truck to a bin.

FIG. 2 is a schematic depiction of the material-conveying system 10 transferring material from a truck 40 to a bin 50. Although a truck and fixed bin are illustrated, the truck may be generally any material container and the bin may be generally any other material container so that, in general terms, the transfer of material is from a first material container to a second material container. In FIG. 2, the material-conveying system 10 includes a material-conveying apparatus 20 for conveying material e.g. an auger, belt conveyor, etc. The system 10 includes an electronic control unit 60 mounted to, or otherwise disposed at, the apparatus for controlling its performance. A user interface control panel 70 is mounted to, or otherwise disposed at, the apparatus 20 and is connected or wired to the electronic control unit 60 to receive user input commands to control a power unit 80 and the material-conveying apparatus 20 such as, for example, a grain auger. This panel 70 enables a user to operate the apparatus 20 while standing or sitting beside the apparatus. This panel 70 also serves as a useful backup input device in case the portable remote control device 100 is misplaced, malfunctions or the battery is dead. The system 10 includes a power unit 80, e.g., a tractor PTO, mechanically coupled to the material-conveying apparatus 20 via a PTO driveline or driveshaft 82 for powering the apparatus 20. The system 10 includes a data bus 90, e.g. an ISOBUS, communicatively connected between the power unit 80 and the electronic control unit 60. The system 10 includes a portable remote control device 100 for wirelessly transmitting command signals for remotely controlling a power output of the power unit 80 to the apparatus 20. The system 10 includes a wireless receiver 22 at, or connected to, the apparatus 20 for receiving the command signals from the portable remote control device 100 and for transmitting the command signals to the electronic control unit 60 that controls the power output of the power unit 80. The portable remote control device 100 is also configured to communicate wirelessly with a gate controller 44 (or "gate actuator") to actuate (i.e. open or close) a material-unloading gate 46. The gate actuator may be, for example, a linear actuator. In other words, the portable remote control device 100 is configured to wirelessly transmit a control signal to a gate receiver 42 which provides a command signal to the gate controller 44 at a hopper 45 or other bottom opening or outlet port of the truck 40 or other material container. Grain or other material can thus be unloaded from the truck by remote control. This greatly improves operating efficiency. For remotely controlling the system of FIG. 2, the portable remote control device 100 provides a gate-actuating user input device or user interface element. When the user provides user input to the gate-actuating user input device, the portable remote control device 100 communicates wirelessly with the gate receiver 42 to deliver a control signal to the gate controller 44 to remotely actuate the hopper gate 46. Receiver 42 may be integrated with the controller 44 in one embodiment. The gate may thus be opened remotely to unload material from the truck.

Optionally, the portable remote control device 100 may be further configured to wirelessly receive a signal from a bin fill sensor 51 it a material-containing bin 50 and/or to wirelessly receive a signal from a body-sensing bin sensor 53 at the material-containing bin 50. The bill fill sensor 51 may transmit its signal via a first bin transmitter 52. The body-sensing bin sensor 53 may transmit its signal via a second bin transmitter 54. In other embodiment, a single bin-mounted transmitter may transmit signals for both the bill fill sensor 51 and the body-sensing bin sensor 53. The body-sensing sensor may be a bin thermal sensor, bin-mounted camera, motion detector, etc.

Figure 3:
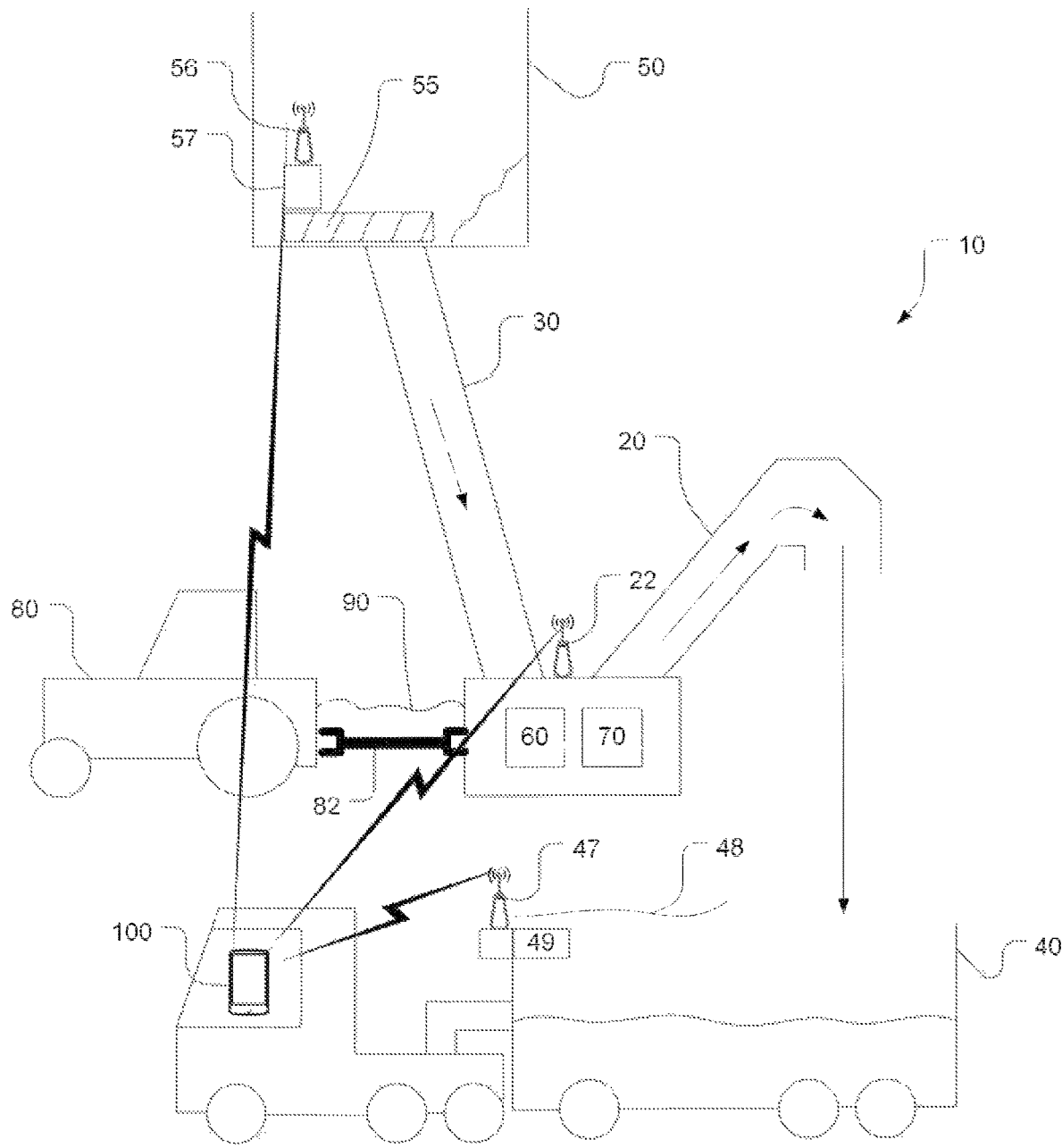
FIG. 3 is a schematic depiction of the material-conveying system of FIG. 1 when transferring material from a bin to a truck.

As depicted by way of example in FIG. 3, the portable remote control device 100 may also optionally be configured to wirelessly open and close a tarp 48 on the truck 40. In other words, the portable remote control device 100 may transmit a control signal to a tarp actuator 49 to open or close the tarp 48 on the truck 40 or other material container. Remotely opening the tarp is useful when transferring material from a bin 50 to a truck 40 as shown in FIG. 3. To make this loading operation easier and more efficient, the portable remote control device 100 comprises a tarp-actuating user input device that causes the portable remote control device 100 to communicate wirelessly with a tarp receiver 47, which is communicatively connected to the tarp controller 49 for remotely actuating the tarp 48 on the truck 40 that is opened to load material into the truck 40. The tarp receiver 47 and the gate receiver 42 may be separate receivers or these may be integrated into a single truck-mounted receiver (or transceiver) for receiving both tarp and gate signals.

As further depicted in FIG. 3, the portable remote control device 100 may also be used to wirelessly control a bin sweep 55 inside the material-containing bin 50. The bin sweep sweeps material from the bin into the swing auger 30 for conveying to the main auger 20. Wireless signals are received by a bin-mounted receiver 56 which provides the signals to a bin sweep controller 57 for controlling the bin sweep. The bin 50 may also include a bin fill sensor 51 and/or a body-sensing bin sensor 53 described above with respect to FIG. 2.

In one embodiment, an emergency stop button is provided on the portable remote control device 100 and/or the user interface control panel 70 for stopping the power output to the apparatus 20 and for stopping the bin sweep 55 within the bin 50. An additional emergency stop button may be placed elsewhere on the apparatus in addition to the one at the panel 70. The emergency stop button may be a hard key (toggle, switch, button, etc.) or a soft key on a touch-screen device. The emergency stop button enhances user safety by enabling the user or another person to immediate shut down the system.

Another safety feature which may be included in this system is a body-detecting safety sensor which is disposed at or near the material-conveying system and the PTO drive shaft. The safety sensor may be a light curtain, ultrasound proximity system or other safety zone sensor that detects the presence of a body close to the material-conveying system and the PTO drive shaft. When the safety sensor detects a body near the PTO driveshaft or the apparatus (e.g. auger), it automatically shuts off the PTO power to the auger. This acts as a safety switch or "kill switch" to minimize the risk of injury.

Optionally, the system may include a material-displacement sensor for sensing displacement of material and for sending a material-displacement signal to the electronic control unit to automatically control the power output to the material-conveying apparatus. The material-displacement sensor may be a material flow sensor, a visual sensor (e.g. camera), a vibration sensor, a sound sensor for sensing the characteristic sound of flowing material, or a torque meter for measuring the load on the apparatus or on the drive shaft. The sensor signal may be used by the electronic control unit to adjust the speed of the auger by regulating the power output to the auger. Adjusting the speed also includes activating (turning on) the power output to the PTO when material flow into the apparatus is detected or deactivating (shutting off) the power output by the PTO when material flow into the apparatus ceases.

Figure 4:
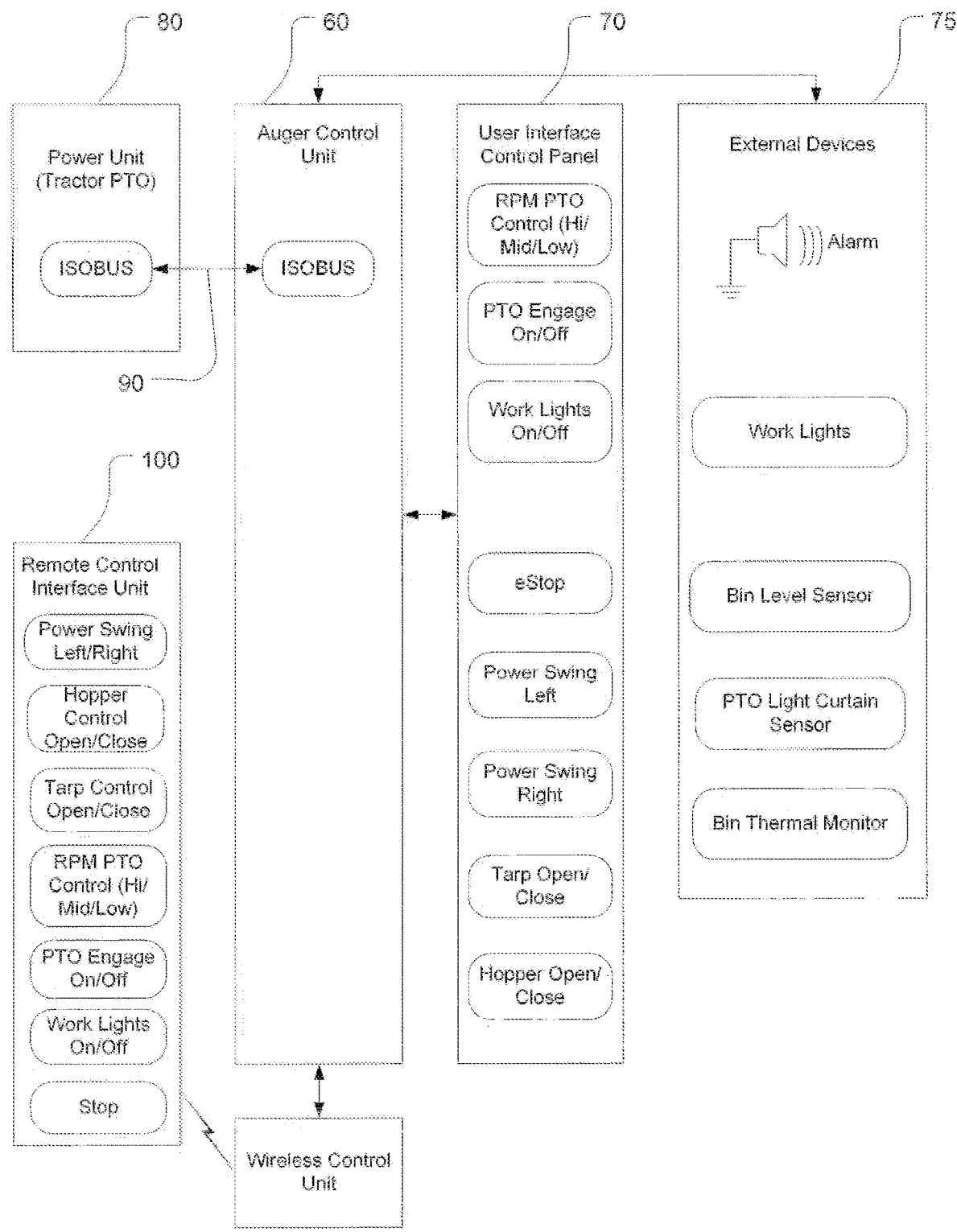
FIG. 4 is functional block diagram of the system of FIG. 1.

FIG. 4 is a functional block diagram of one embodiment of the system 10. The power unit 80 may be a tractor power takeoff (PTO), a standalone internal combustion engine (e.g. a diesel engine), or an engine mounted directly to the auger. The power unit 80 is mechanically and electrically coupled to the auger. The present invention is intended primarily for use with a tractor PTO but may also be used, or adapted for use, with another type of power unit such as an internal combustion engine (especially a diesel engine).

In the schematic of FIG. 4 the power unit 80 is connected to the electronic control unit 60 by the ISOBUS-compatible data bus 90. The electronic control unit 60 is connected to the user interface control panel 70 to permit direct manual control by a user standing at the auger. The remote control interface 100 may duplicate all of the controls found at the user interface control panel 70. The electronic control unit 60 may also control one or more of various external devices 75 such as, for example, an audible alarm, work lights, bin level sensor, PTO light curtain sensor and bin thermal monitor.

The portable remote control device 100 may have controls (e.g. buttons, toggles, switches, or virtual user interface elements on a touch-screen control unit). These controls may include buttons for power swing control (swing left/swing right), hopper control (e.g. open hopper/close hopper), tarp control (e.g. open/close tarp), RPM PTO control (high, middle, low or idle), PTO engage (on/off), work lights (on/off), stop (kill switch). It will be appreciated that not all of these buttons, switches or toggles are required. It will also be appreciated that the order of the buttons may vary it will also be appreciated that additional buttons, toggles, switches, joysticks, or controls may be provided for these or other functions. As such, the schematic of the portable remote control device depicted in this figure is meant to be exemplary only.

FIGS. 5-8 depict three examples of different handheld wireless controllers or portable remote control devices 100 that may be used to remotely control the power output to the auger or other material-conveying apparatus.

Figure 5:
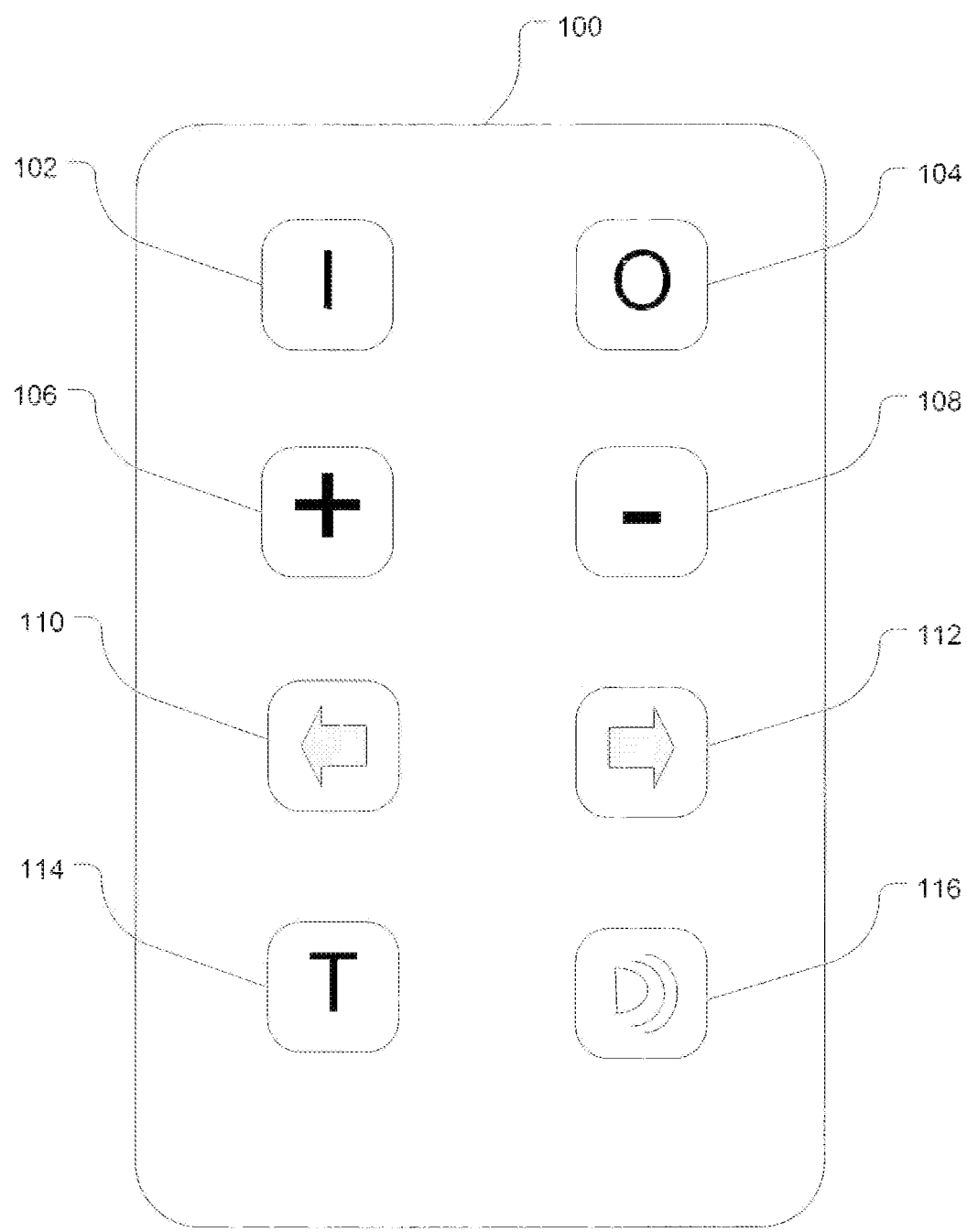
FIG. 5 depicts a first example of a portable remote control device for controlling the material-conveying system.

FIG. 5 depicts a first example of a handheld wireless controller 100 having a plurality of buttons, e.g. tactile dome buttons. In the illustrated embodiment, the handheld wireless controller 100 has an ON button 102, an OFF button, an increase-RPM button 106, a decrease-RPM button 108, a swing left button 110 for the swing auger, a swing right button for the swing auger 112, a tarp open/close button 114 and a lights on/off button 116. The wireless controller 100 may be of a type sold by Lodar Ltd. (www.lodar.com) operating in a 418 or 434 MHz band or any similar or functionally equivalent type of wireless controller.

Figure 6:
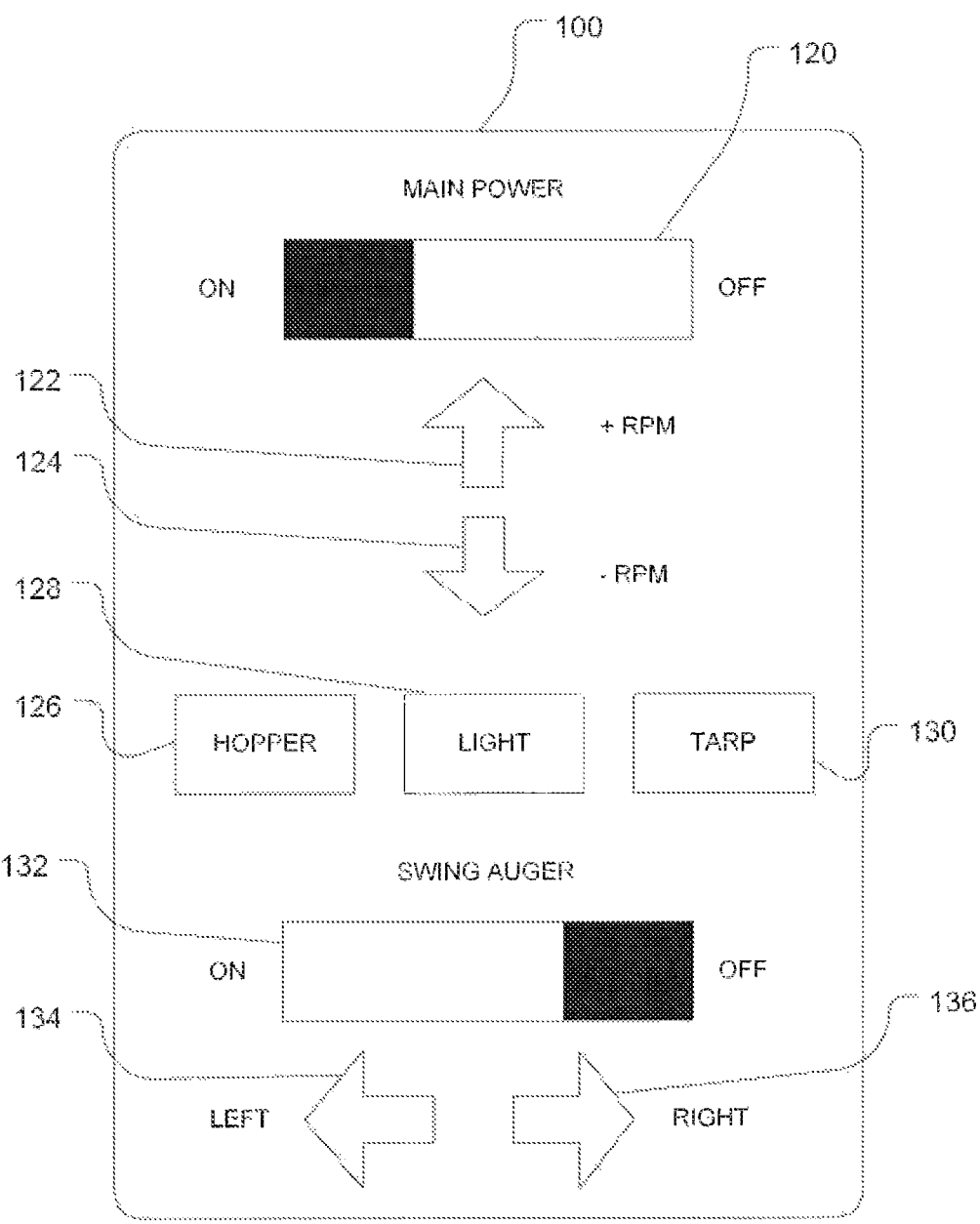
FIG. 6 depicts a second example of a portable remote control device for controlling the material-conveying system.

FIG. 6 depicts another example of a handheld wireless controller 100. This handheld wireless controller 100 has a toggle switch 120 to toggle between ON and OFF. Engine RPM is controlled using an upwardly pointing arrow-shaped UP button 122 and a downwardly pointing arrow-shaped DOWN button 124. Buttons 126, 128 and 130 operate the hopper, light(s) and tarp, respectively. The swing auger is turned on and off using an ON/OFF toggle switch 132. Leftward pointing arrow-shaped button 134 and rightward pointing arrow-shaped button 136 cause the swing auger to swing left or right, respectively.

The handheld wireless controllers 100 of FIG. 5 and FIG. 6 may include a printed circuit board (PGB) with a circuit or circuitry made of discrete electronic components (e.g. resistors, capacitors, inductor coils, etc.) forming an RF transmitter circuit. The transmitter may also be provided in the form of an integrated circuit (IC) or chip This portable remote control device 100 may be any portable, handheld, wearable, mountable or mobile device that includes a radiofrequency (RF) transmitter for wirelessly transmitting RF signals to a wireless receiver (or wireless control unit) that is either part of the electronic control unit or connected to the electronic control unit. Commands from the portable remote control device are received by the wireless receiver and shared with the electronic control unit to enable the latter to effect control action relative to the auger and also with respect to the power unit. For example, the remote control interface may be used to control the power being output by the tractor PTO to the auger. In this manner, the portable remote control device (PRCD) 100 can be used to control the tractor PTO remotely. The PRCD 100 may be implemented as a dedicated handheld controller or implemented in a software application executed by a wireless communications device or mobile device such as a smart phone, tablet, etc. Alternatively, the PRCD 100 may be implemented as part of a key fob that holds the key that turns on the ignition of the tractor or other power unit. If implemented as a mobile app, program instructions in code are recorded on a non-transitory computer-readable medium. The computer program instructions are loaded as code into the memory of a mobile device and executed by a processor of the mobile device to cause the mobile device to display user-selectable interface elements (virtual buttons or toggles) representing various commands (e.g. power swing left/right, hopper control open/close, tarp control open/close, RPM PTO control PTO engage, work lights off/off, stop). In response to receiving user input commands via the user interface (e.g. touch screen display), the code causes the mobile device to interact with a radiofrequency transceiver of the mobile device to wirelessly transmit a command to a wireless receiver at the electronic control unit. Any suitable short-range wireless communication protocol may be utilized for transmitting the commands, e.g. Bluetooth®, ZigBee® RF4CE (Radio Frequency for Consumer Electronics), Wi-Fi™, Z-Wave or equivalent. For example, a ZigBee® RF4CE remote control system compliant with the IEEE 802.15.4 standard operates in the 2.4 GHz frequency band and provides bi-directional communication. Bluetooth® operates in the range of 2400-2483.5 MHz. Line-of-sight control may also be effected using infrared. The remote control may also operate in the 418 or 434 MHz bands for Lodar controllers. The remote control device may also operate in the radio frequency band of 27 MHz or 49 MHz which has been allocated by the FCC for basic consumer items, such as garage door openers, walkie-talkies and radio-controlled toys. As will be appreciated, any suitable RF band may be used to effect remote control of the power unit coupled to the conveyor.

Figure 7:
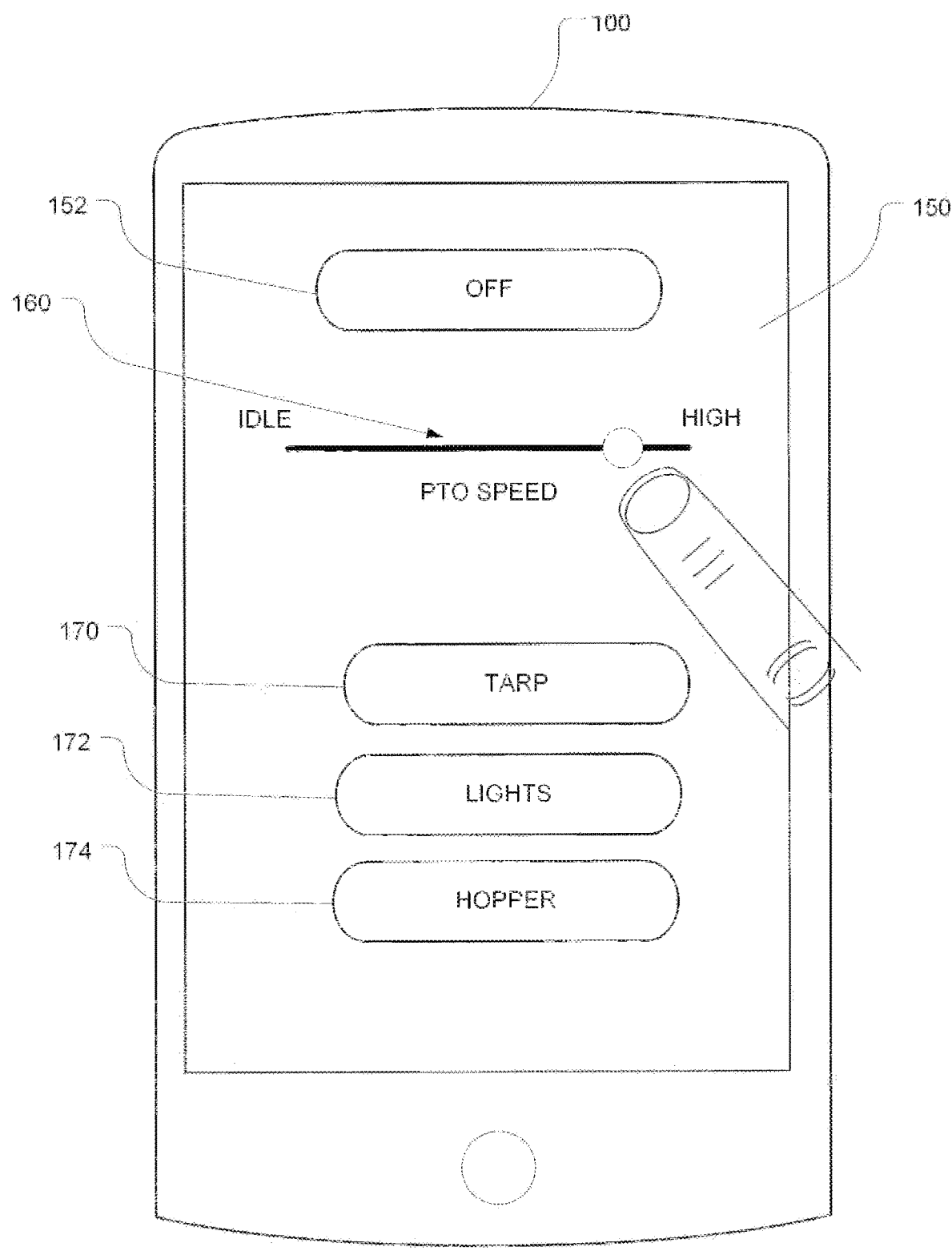
FIG. 7 depicts a wireless communications device having a software application that enables the wireless communications device to control the material-conveying system.
Figure 8:
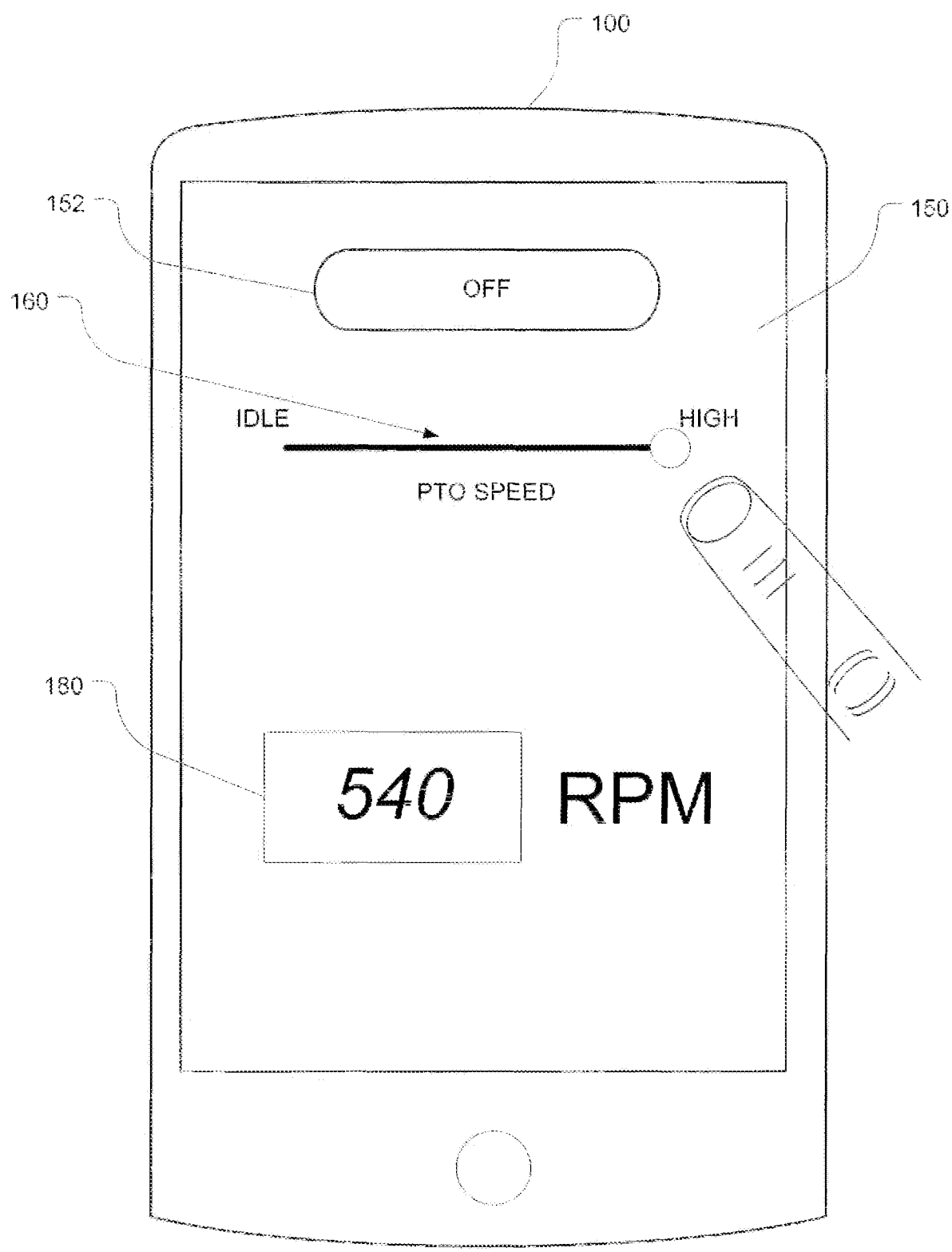
FIG. 8 depicts a wireless communications device displaying operating information received from an electronic control unit of a material-conveying apparatus.

As shown in FIGS. 7-8, the portable remote control device 100 may be implemented as a wireless communications device or mobile communications device having a software application executed by a processor of the device 100 that cooperates with a short-range wireless transceiver, e.g. a Bluetooth chip, to transmit command signals to the electronic control unit. The portable remote control device 100 may be paired, registered or linked with the wireless receiver to ensure that the portable remote control device 100 only controls the one desired apparatus and not another nearby apparatus by mistake (as multiples devices may be used in the same vicinity to control different apparatuses). The device may be configured to automatically disconnect the link when the device strays a certain distance from the receiver. The application may be downloaded and installed on any wireless communications device or mobile device such as a smart phone, cell phone, personal digital assistant (PDA), tablet, laptop, notebook, etc. The software application is a computer program embodied as a computer-readable medium that contains, stores, communicates, propagates or transports the program for use by or in connection with the processor or other instruction-execution component of the device. The computer-readable medium may be electronic, magnetic, optical, electromagnetic, infrared or any semiconductor system or device. For example, computer-executable code may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware or firmware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

In the embodiment depicted by way of example in FIG. 7, the wireless communications device 100 includes a touch screen 150 for receiving user commands or user input that controls the power output to the conveyor (e.g. auger) by the power unit (e.g. tractor PTO). The wireless communications device 100 may present or display a virtual STOP button in the form a user-selectable interface element 152. The wireless communications device may display virtual buttons in the form of user-selectable interface elements 160, 170, 172, and 174 to control various power output to the conveyor and other functions or subsystems. A virtual slider 160 is displayed to enable touch-sensitive input to slide the slider 160 left or right to decrease or increase the RPM of the power unit (e.g. PTO). The tarp may be controlled (opened or closed) by user-selectable interface element 170. The light(s) may be operated (turned on or off) by user-selectable interface element 172. The hopper may be operated (opened or closed) by user-selectable interface element 174. These are depicted by way of example only. The wireless communications device 100 may have fewer user-selectable interface elements than shown or more user-selectable interface elements than shown. The layout and type of the user-selectable interface elements may also be varied. The display presentation may also be user-configurable based on user settings or preferences.

In one specific embodiment, as depicted by way of example in FIG. 8, the display 150 of the wireless communications device 100 may present feedback information about the power being output to the auger. For example, the wireless communications device 100 may display a virtual tactometer 180 (with a digital readout as shown or with a virtual RPM gauge). In embodiments of the invention, there may be engine control logic to cause the PTO to reach a desired RPM or to operate within a desired RPM band. The power unit may include an engine control unit (ECU) that regulates the maximum engine RPM. Alternatively, or additionally, the electronic control unit may limit the requested power output based on the auger type in order to prevent an over-speed or red-line condition. This condition may be displayed on a screen of the wireless communications device.

Another inventive aspect is a software application embodied as a computer-readable medium which may be downloaded onto a wireless communications device to enable a user to remotely control the system. The computer-readable medium includes computer instructions in code which when stored in a memory and executed by a processor of a wireless communications device cause the wireless communications device to present a user interface configured to receive a power control command, transmit using a radiofrequency transceiver, in response to receiving the power control command, a power control signal representing the power control command to a wireless receiver connected to an electronic control unit at the material-conveying apparatus that transmits the power control signal via a data bus to the power unit to thereby operate the material-conveying apparatus in response to the power control command. The code also causes the device to receive a gate control command via the user interface and transmit, using the radiofrequency transceiver, in response to receiving the gate control command, a gate control signal representing the gate control command to a gate controller of a material-unloading gate of a material container for operating the gate in response to the gate control command. The application may be programmed in any suitable language, whether object-oriented or not, e.g. Java, Javascript, PHP, C #, Objective-C, .NET (Visual C++), Perl, Ruby, etc.

In another embodiment, the system may include one or more digital cameras for displaying a real-time camera image or real-time video feed on a display screen of the wireless communications device to enable the operator (user) to observe the relative positioning of one component to another. Cameras may also be mounted to show the amount of material being conveyed of the material-conveying apparatus or to show how much material is in the bin or in the truck. The application executed by the wireless communications device for controlling the system may provide a user interface element for switching between various camera views to display real-time video from any of the system cameras or may simultaneously display multiple camera views in a split-screen display mode.

In another embodiment, the system may include a positioning device to position the swing auger relative to the hopper of the truck. This may be, for example, a camera-based system or one or more ultrasound proximity sensors.

To summarize, the present invention provides a remote controlled material-conveying system enabling a user to remotely control the power output to a material-conveying apparatus like a grain auger. In the illustrated embodiments, the system includes a remote-controlled gate controller to remotely control the gate of a material container like a truck.

Yet a further inventive aspect is a remote-controlled material-conveying system enabling a user to remotely control the power output to a material-conveying apparatus in which the system includes a material-displacement, sensor for sensing displacement of material and for sending a material-displacement signal to the electronic control unit to automatically control the power output to the material-conveying apparatus. This system may optionally include a gate controller, a tarp controller, a bin sweep controller, an emergency stop button, a material-displacement sensor and any of the other features or options described above in any suitable combination or sub-combination.

Yet a further inventive aspect is a remote-controlled material-conveying system enabling a user to remotely control the power output to a material-conveying apparatus in which the system includes a body-detecting safety sensor for detecting a body near a driveshaft of the power unit or near the material-conveying apparatus, the safety sensor sending a shutdown signal to the electronic control unit to shut off the power output to the apparatus. This system may optionally include a gate controller, a tarp controller, a bin sweep controller, a material-displacement sensor, an emergency stop button and any of the other features or options described above in any suitable combination or sub-combination.

In another inventive aspect, the system provides both remote control of the power output to a material-conveying apparatus and also an emergency stop user input device for shutting off the power output to the apparatus and for stopping a bin sweep in a bin. This system may optionally include a gate controller, a tarp controller, a bin sweep controller, a material-displacement sensor, a body-detecting safety sensor and any of the other features or options described above in any suitable combination or sub-combination.

In another inventive aspect, the system provides both remote control of the power output to a material-conveying apparatus and also remote bin sweep control by providing the portable remote control device with a user interface element to wirelessly control a bin sweep inside a material-containing bin. This system may optionally include a gate controller, a tarp controller, an emergency stop button, a material-displacement sensor, a body-detecting safety sensor and any of the other features or options described above in any suitable combination or sub-combination.

As will be appreciated, the system may have remote PTO power control with one of various additional functions: gate actuation, tarp actuation, bin sweep control, body-detecting safety sensor, material-displacement sensor. In addition to the core PTO power control, the system may include any one or more of these additional functions.

The embodiments of the invention described above provide an improved system for handling grain or other such material. The system provides improved safety and efficiency of operation.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concepts) disclosed herein. The scope of the exclusive right sought by the applicant(s) is therefore intended to be limited solely by the appended claims.

The invention claimed is:

1. A material-conveying system comprising:
   a material-conveying apparatus comprising a main auger or conveyor belt for conveying material and a powered swing auger for conveying material to the main auger or conveyor belt, wherein the powered swing auger is rotatable relative to the main auger or conveyor belt;
   an electronic control unit at the apparatus;
   a user interface control panel interfaced with the electronic control unit to receive user input commands to control the apparatus;
   a power unit mechanically coupled to the apparatus for powering the apparatus;
   a data bus communicatively connected between the power unit and the control unit;
   a portable remote control device for wirelessly transmitting command signals for remotely controlling a power output of the power unit to the apparatus; and
   a wireless receiver at the apparatus for receiving the command signals from the portable remote control device and for transmitting the command signals to the electronic control unit that controls the power output of the power unit,
   wherein the portable remote control device further comprises a user input device for wirelessly transmitting a command causing the powered swing auger to swing left or to swing right relative to the main auger or conveyor belt of the material-conveying apparatus and a separate user input device on the portable remote control device for increasing or decreasing a rotational speed of the power unit;
   wherein the portable device further comprises a display which provides feedback information related to the power unit.

2. The system of claim 1 wherein the portable remote control device is also configured to wirelessly transmit a control signal to a tarp actuator.

3. The system of claim 1 wherein the portable remote control device is also configured to wirelessly receive a signal from a bin fill sensor at a material-containing bin.

4. The system of claim 1 wherein the portable remote control device is also configured to wirelessly receive a signal from a body-sensing bin sensor at a material-containing bin.

5. The system of claim 1 wherein the portable remote control device is also configured to wirelessly control a bin sweep inside a material-containing bin.

6. The system of claim 1 comprising a material-displacement sensor for sensing displacement of material and for sending a material-displacement signal to the electronic control unit to automatically control the power output to the material-conveying apparatus.

7. The system of claim 1 wherein the portable remote control device comprises an emergency stop user input device for shutting off the power output to the apparatus and for stopping a bin sweep in a bin.

8. The system of claim 1 comprising a body-detecting safety sensor for detecting a body near a driveshaft of the power unit or near the material-conveying apparatus, the safety sensor sending a shutdown signal to the electronic control unit to shut off the power output to the apparatus.

9. The system of claim 1 wherein the power unit is a power takeoff (PTO) of a tractor and the apparatus is a grain auger and wherein the data bus is an ISOBUS-compatible data bus.

10. The system of claim 1 wherein the portable remote control device further comprises a user input device for operating a work light.

11. The system of claim 1 wherein the electronic control unit receives signals from a bin level sensor, a PTO light curtain sensor and a bin thermal monitor.

12. The system of claim 1 wherein the portable remote control device is a wireless communications device comprising a memory for storing a system-controlling application and a processor for executing the application to display graphical representations of system controls on a display of the wireless communications device.

13. The system of claim 12 wherein the application also causes the wireless communications device to display operating information based on performance data received from the electronic control unit.

14. The system of claim 1 wherein the portable remote control device is configured to wirelessly transmit a control signal to a gate controller of a material-unloading gate of a material container.

15. The system of claim 1 wherein the feedback information displayed by the display on the portable remote control device is RPM of the power unit.

16. The system of claim 1 wherein the feedback information displayed by the display on the portable remote control device is an over-speed or red-line condition of the power unit.

17. A portable remote control device for remotely controlling a material-conveying system having a material-conveying apparatus driven by a power unit, the portable remote control device comprising:
a user interface configured to receive a power control command for controlling the material-conveying apparatus;
a radiofrequency transceiver that transmits, in response to receiving the power control command, a power control signal representing the power control command to a wireless receiver connected to an electronic control unit at the material-conveying apparatus that transmits the power control signal via a data bus to the power unit to thereby operate the material-conveying apparatus in response to the power control command; and
wherein the radiofrequency transceiver transmits, in response to receiving user input on the user interface, a signal to operate the material-conveying apparatus in response to receiving the signal, wherein the material-conveying apparatus comprises a main auger or conveyor belt and a powered swing auger for conveying material to the main auger or conveyor belt,
wherein the user interface comprises a user input device for wirelessly transmitting a command causing the powered swing auger to swing left or swing right relative to the main auger or conveyor belt of the material-conveying apparatus and a separate user input device for increasing or decreasing a rotational speed of the power unit;
wherein the user interface is further configured to provide feedback information related to the power unit.

18. The portable remote control device of claim 17 wherein the user interface is configured to receive a tarp control command and wherein the transceiver wirelessly transmits, in response to receiving the tarp control command, a tarp control signal to a tarp actuator.

19. The portable remote control device of claim 17 wherein the radiofrequency transceiver is configured to wirelessly receive a signal from a bin fill sensor at a material-containing bin.

20. The portable remote control device of claim 17 wherein the radiofrequency transceiver is configured to wirelessly receive a signal from a body-sensing bin sensor at a material-containing bin.

21. The portable remote control device of claim 17 wherein the user interface comprises an emergency stop user input device for shutting off the power output to the apparatus and for stopping a bin sweep in a material-containing bin.

22. The portable remote control device of claim 17 wherein the user interface comprises a user input device for operating a work light.

23. The portable remote control device of claim 17 wherein the user interface is a touch-screen display of a wireless communications device and the radiofrequency transceiver is a short-range wireless transceiver of the wireless communications device.

24. The portable remote control device of claim 23 further comprising a processor that cooperates with the display to present graphical representations of controls on the display of the wireless communications device.

25. The portable remote control device of claim 24 wherein the processor is configured to display operating information based on performance data received from the electronic control unit.

26. The portable remote control device of claim 17 wherein the user interface is configured to receive a gate control command and wherein the radiofrequency transceiver transmits, in response to receiving the gate control command, a gate control signal representing the gate control command to a gate controller of a material-unloading gate of a material container for operating the gate in response to the gate control command.

27. A non-transitory computer-readable medium comprising computer instructions in code which when stored in a memory and executed by a processor of a wireless communications device cause the wireless communications device to:
graphically present a user interface configured to receive a power control command;
wirelessly transmit using a radiofrequency transceiver, in response to receiving the power control command, a power control signal representing the power control command to a wireless receiver connected to an electronic control unit at a material-conveying apparatus comprising a main auger or conveyor belt and a powered swing auger for conveying material to the main auger or conveyor belt; and cause the user interface to display a power swing user interface element configured to receive user input causing the powered swing auger to swing left or swing right relative to the main auger or conveyor belt of the material-conveying apparatus and to display separate user interface elements configured to receive user input for increasing or decreasing a rotational speed of a power takeoff (PTO) that powers the material-conveying apparatus;

wherein the user interface is further configured to provide feedback information related to the PTO.

28. The computer-readable medium of claim 27 comprising code that configures the device to receive a tarp control command and to cause the transceiver to wirelessly transmit, in response to receiving the tarp control command, a tarp control signal to a tarp actuator.

29. The computer-readable medium of claim 27 comprising code that configures the device to wirelessly receive a signal from a bin fill sensor at a material-containing bin.

30. The computer-readable medium of claim 27 comprising code that configures the device to wirelessly receive a signal from a body-sensing bin sensor at a material-containing bin.

31. The computer-readable medium of claim 27 comprising code that causes the user interface to display an emergency stop user interface element for shutting off the power output to the apparatus and for stopping a bin sweep in a material-containing bin.

32. The computer-readable medium of claim 27 comprising code that causes the user interface to display a work light user interface element for operating a work light.

33. The computer-readable medium of claim 27 comprising code that causes the device to present graphical representations of controls on the display of the wireless communications device.

34. The computer-readable medium of claim 33 comprising code that causes the device to display operating information based on performance data received from the electronic control unit.

35. The computer-readable medium of claim 27 comprising code to display a real-time video feed from a digital camera mounted on the material-conveying apparatus.

36. The computer-readable medium of claim 27 comprising code that configures the device to:
receive a gate control command via the user interface; and
transmit, using the radiofrequency transceiver, in response to receiving the gate control command, a gate control signal representing the gate control command to a gate controller of a material-unloading gate of a material container for operating the gate in response to the gate control command.

* * * * *